Feb. 16, 1926.

F. C. HUGHES

TIRE VALVE CASING CAP

Filed Jan. 12, 1925

1,573,495

Inventor:
Frank C. Hughes,

Patented Feb. 16, 1926.

1,573,495

UNITED STATES PATENT OFFICE.

FRANK C. HUGHES, OF CHICAGO, ILLINOIS.

TIRE-VALVE-CASING CAP.

Application filed January 12, 1925. Serial No. 1,844.

*To all whom it may concern:*

Be it known that I, FRANK C. HUGHES, a citizen of the United States, residing at 2512 West Monroe Street, Chicago, in the county of Cook and State of Illinois, have invented a new and useful Improvement in Tire-Valve-Casing Caps, of which the following is a specification.

This invention relates to improvements in tire valve casing caps more especially adapted for use in connection with automobile tire valves. My improved cap is designed to effectually prevent the escape of air from an automobile tire. The ordinary automobile tire has a check valve adapted to prevent the escape of air but frequently such check valves have slow leaks, and consequently it is customary to provide an additional cap for the end of the casing in which the check valve is located to stop the escape of any air that may pass the check valve.

The check valve is ordinarily provided with a valve stem or pin, the end of which usually extends a short distance beyond the end of the valve casing. If this valve stem is pushed inwardly or moved to one side, it causes an unseating of the check valve which is likely to permit dust or dirt to get in the check valve or cause it to be otherwise damaged. It is desirable, therefore, to provide a cap for the end of the valve casing which will not in any way interfere with the projecting end of the valve stem. My improved cap, however, is so designed that it will make a tight air joint at the end of the valve casing and thus hold air whether the valve stem is pressed inwardly or not. The cap is preferably made, however, so that when screwed down tightly, the projecting end of the valve stem is not disturbed.

My improved cap can be cheaply and easily made, is neat in appearance, and strong and durable and gives a tight air joint.

Other features and advantages of my improved cap will appear more fully as I proceed with my specification.

Figure 1:
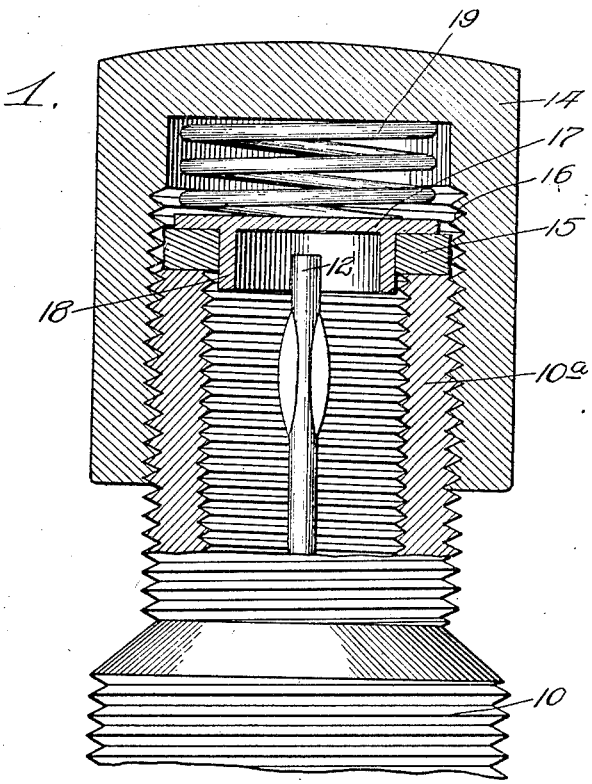
Figure 2:
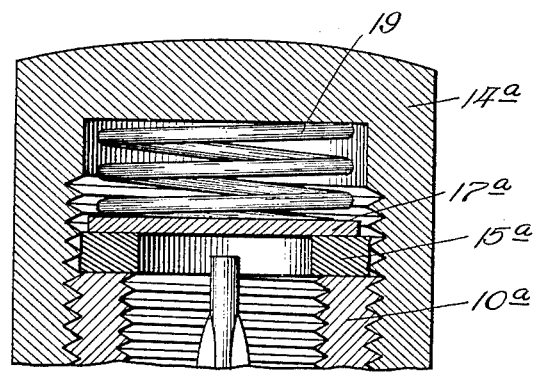

In that form of device embodying the features of my invention shown in the accompanying drawings, Fig. 1 is a vertical sectional view of the upper end of a tire valve casing showing my improved cap in place and Fig. 2 is a similar view showing a modified form.

As shown in the drawings, 10 indicates the upper part of an ordinary tire valve casing. The upper end of this casing, as indicated by $10^a$, is reduced in diameter. The casing is externally and internally threaded. The internal threads are used for putting in place the check valve, this commonly being referred to as the valve "insides" and screwed into place in the valve casing from the top by means of the internal threads. This check valve (not shown, and forming no part of the present invention) has a valve stem or pin 12, the end of which ordinarily projects a short distance beyond the end of the casing $10^a$ as shown. 14 indicates the cap proper which is adapted to be screwed on to the external threads of the reduced upper end or nipple $10^a$ of the valve casing. Within the cap is placed a packing ring or washer 15 which may be made of any suitable material such as, for example, rubber, leather, fiber, asbestos, felt, or the like. The ring or washer 15 is adapted to rest on the upper end of the casing $10^a$ as shown. The external diameter of this washer is great enough so that its outer surface will engage the internal threads 16 of the cap sufficiently to prevent the washer from falling out when the cap is not in place. This engagement with the threads is not sufficient, however, to prevent the washer 15 from moving upwardly or downwardly within the cap as will be explained more in detail hereinafter.

On top of the cap there is placed a stiff circular disk 17 which may be made, for example, of metal. This disk is provided with a depending circular flange 18 having an external diameter slightly smaller than the internal diameter of the casing $10^a$, so that such flange will fit snugly in the end of the valve casing. The fit is not tight enough, however, to prevent free up or down movement of said disk 17. The internal diameter of the washer 15 is also preferably of such size that said washer will fit closely, but not tightly, on this flange 18.

Above the disk 17 there is provided a spiral spring 19 interposed between said disk and the upper end of the cap 14. In operation, the cap is screwed into place until the washer 15 engages the upper end of the casing $10^a$. Further screwing down of the cap forces the washer 15 and disk 17 upwardly in the cap compressing the spring 19. The cap is screwed down until the spring 19 is slightly compressed but preferably not to the limit of its compression.

When the cap is thus in place, the spring 19 furnishes a continuous downward pressure on the disk 17 holding the washer 15 tightly clamped between the outer edge of this disk and the upper end of the casing 10ª. Because of this spring pressure, the washer 15 is always held firmly in place; and this spring pressure will compensate for any variations in thickness that may occur in said washer 15 due to the pressure, changes in temperature, or other causes. Since the depending flange 18 fits snugly in the end of the valve casing, it will be seen that this flange always prevents the packing washer or packing material 15 from being forced or oozing into the interior of the valve casing itself. No matter how tightly the cap is screwed into place, or how forcibly the spring 19 presses downwardly, none of the packing material 15 can be squeezed down into the valve casing. In other words, the disk 17 with the flange 18, acts as a plug or stopper for the upper end of the valve casing, thus preventing any of the packing material from escaping or being forced into the valve casing. When I speak of the packing material as having a tendency to enter the valve casing, I do not mean necessarily that the packing material in separated pieces, or in one piece, is likely to go way down inside of the valve casing and thus interfere with the working valve parts; but I mean merely that the packing material is likely to find an exit toward the interior of the valve casing, or ooze inwardly to such an etxent that the compression under which it is first put will be relieved to such an extent that the spring 19 will expand to the limit of its length and yet fail to compress the washer 15 sufficiently to make a tight air joint.

In Fig. 2 there is shown a modified form which is similar in all respects to the preferred embodiment except that the disk 17ª corresponding to the disk 17 in the preferred form does not have the depending flange 18. In this form of device, therefore, there is no means to prevent the packing material 15ª from oozing inwardly or being forced down inside of the valve casing 10ª. When this form of construction is used, the packing ring 15ª should be formed of material having sufficient body or strength so that when it is compressed between the disk 17ª and the upper end of the valve casing 10ª it will not be distorted, or squeezed or forced out from between the compressing members to such an extent as to cause leakage.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A valve casing cap provided with internal threads adapted to engage the external threads of a valve casing; a packing member within said cap adapted to engage the upper end of a valve casing when the cap is screwed into place, said packing member having an external diameter great enough to cause it to yieldingly engage the internal threads of said cap; and spring means above said packing member adapted to yieldingly press said packing member downwardly into engagement with the upper end of a valve casing when the cap is screwed into place.

2. A valve casing cap comprising: a cap proper having internal threads adapted to engage the external threads of a valve casing; packing material within said cap adapted to engage the upper end of a valve casing when the cap is screwed into place, said packing material having an external diameter great enough to cause it to yieldingly engage the internal threads of said cap; spring means above said packing material adapted to yieldingly press said packing material downwardly into engagement with the upper end of a valve casing when the cap is screwed into place; and a separate closing member within said cap adapted to close the end of the valve casing and prevent said packing material from being forced thereinto as the cap is screwed into place.

Witness my hand this 9th day of January, A. D. 1925.

FRANK C. HUGHES.